April 20, 1943.   R. BASSINGER   2,317,021
BYPASS AND RELEASING MEANS
Filed Feb. 5, 1940   2 Sheets-Sheet 1
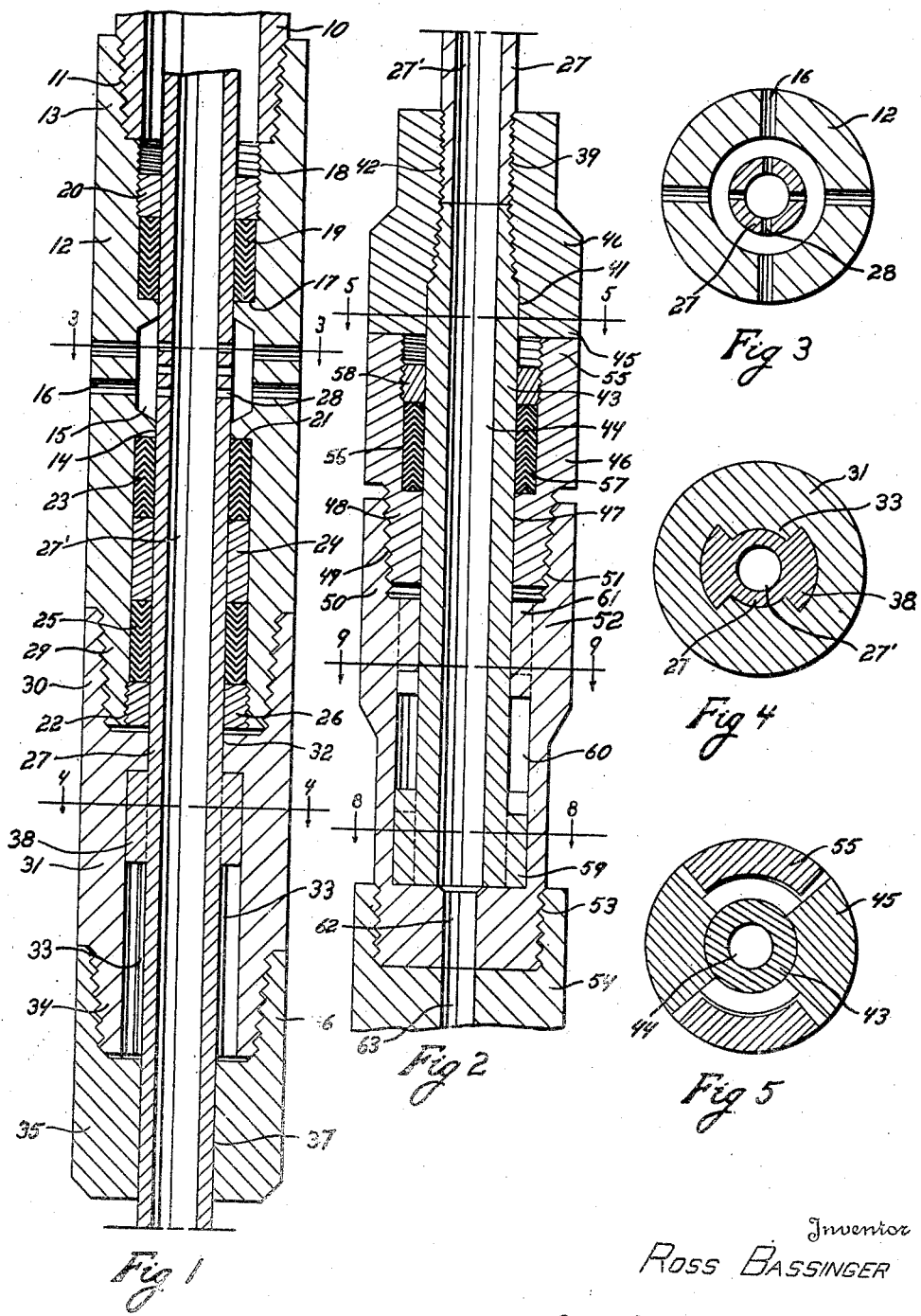
Inventor
ROSS BASSINGER
By Jack A. Achley
Attorney

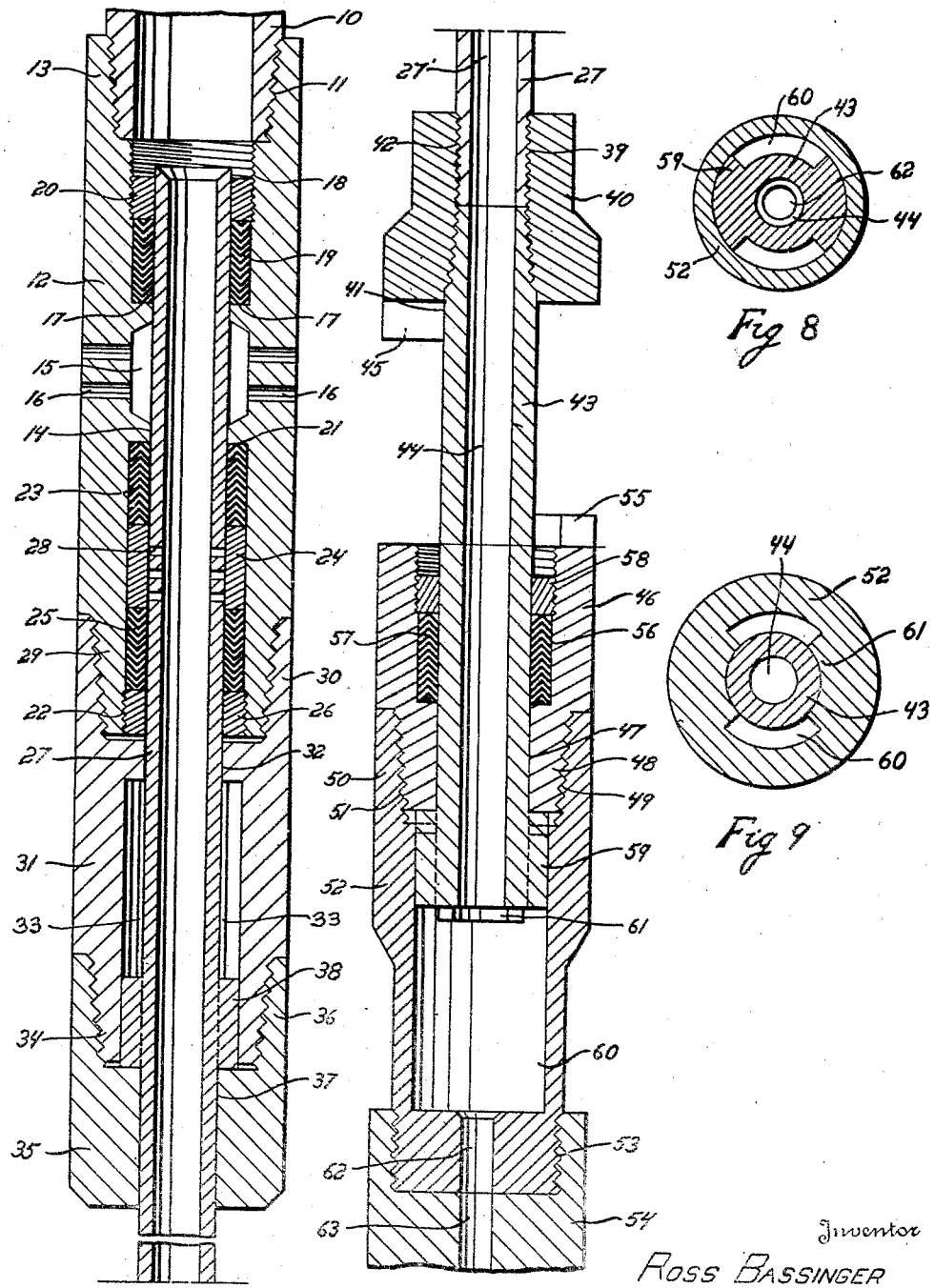

Patented Apr. 20, 1943

2,317,021

UNITED STATES PATENT OFFICE 2,317,021

BY-PASS AND RELEASING MEANS

Ross Bassinger, Houston, Tex.

Application February 5, 1940, Serial No. 317,232

5 Claims. (Cl. 166—1)

This invention relates to new and useful improvements in cementing devices for use in conjunction with cement retainers.

It is a common practice to cement a well bore below a certain stratum so as to close off or seal that portion of the bore below said stratum. It is also a common practice to set a plug of cement in a well bore between two points or two strata so as to effectively separate the upper portion of the bore from the lower portion thereof. In both these instances, and under various other conditions, it is desirable to have some means whereby cement may be conducted to a designated point within the well bore without coming in contact with the well casing, and whereby the cement is held against moving upwardly within the well bore as said cement sets therein. The usual procedure in this case is to lower a cement retainer into the bore of the well by means of a tubing string or other support through which the cement is to be pumped. In my co-pending application, Serial No. 292,029, which became Patent No. 2,230,447 issued February 4, 1941, there has been disclosed a cement retainer suitable for this procedure.

The clutch disclosed in the present application is particularly adapted for use with a cement retainer of this type, but may be utilized in various other modes.

After the retainer has been set and the cement pumped downwardly within the well bore thereto, the tubing string or other means used to conduct the cement downwardly remains full of the cement. It is, therefore, necessary to provide some means whereby the cement may be drained or otherwise removed from said tubing string to permit the disengaging of the tubing from the cement retainer and the withdrawal of said string from the well bore.

It is, therefore, one object of this invention to provide an improved device for use in well cementing and having means for coupling the well tubing, or other cement conductor, to the usual cement retainer, said device being constructed so that the conductor and device may be readily uncoupled from the retainer after the cement has been introduced, whereby the tubing and device may be removed from the well bore following the cementing operation.

An important object of the invention is to provide an improved device for use in well cementing having means for detachably connecting the usual cement retainer to the well tubing or other cement conductor, and being constructed to impart rotation to the retainer to set the same at the desired point in the well bore; said device also having means for bleeding the tubing or conductor of the cement standing therein after the cementing operation is complete, whereby the tubing or conductor is emptied and may be readily removed from the bore upon detachment of the device from the retainer.

A further object of this invention is to provide an improved device for use in well cementing having means for connecting the usual cement retainer to the well tubing or other cement conductor, and having a mandrel therein adapted to undergo longitudinal movement to actuate clutching means whereby the tubing and device may be uncoupled from the retainer and removed from the well bore following the cementing operation; said mandrel also being adapted to bleed the tubing or conductor of the cement standing therein upon the longitudinal movement of the mandrel, whereby the tubing or conductor is emptied and may be readily removed from the well bore.

Still another object of this invention is to provide an improved device for use in well cementing having means for connecting the usual cement retainer to the well tubing or other cement conductor, and having left-hand threads adapted to be rotated through the engagement of clutch means whereby said device and tubing or conductor may be disconnected from the retainer by the right hand rotation of said device, thereby eliminating the possibility of a right hand joint being affected by the disconnecting operation.

A still further object of the invention is to provide an improved device for use in well cementing having means for connecting the usual cement retainer to the well tubing or other cement conductor, said device having clutching means whereby rotative movement may be transmitted from the tubing or cement conductor through the device to the cement retainer to set the same, and having means whereby the clutching means may be disengaged and other clutching means engaged to allow the device and tubing to be disconnected from the retainer after the cementing operation is completed.

A construction designed to carry out the invention will be hereinafter described, together with other features of the invention.

The invention will be more readily understood from a reading of the following specification and by reference to the accompanying drawings, in which an example of the invention is shown, and wherein:

Figure 1 is a longitudinal, sectional view showing a by-pass, constructed in accordance with the invention, in an open or draining position, Figure 2 is a continuation of Figure 1, showing a clutch, constructed in accordance with the invention, in a disengaging position with the connecting joint partially broken, Figure 3 is a transverse cross-sectional view taken on the line 3—3 of Figure 1, Figure 4 is a transverse cross-sectional view taken on the line 4—4 of Figure 1, Figure 5 is a transverse cross-sectional view taken on the line 5—5 of Figure 2, Figure 6 is a longitudinal, sectional view showing the by-pass in a closed position, Figure 7 is a longitudinal, sectional view in continuation of Figure 6, showing the clutch in a position for setting the cement retainer, Figure 8 is a horizontal cross-sectional view taken on the line 8—8 of Figure 2, and Figure 9 is a horizontal cross-sectional view taken on the line 9—9 of Figure 2.

In the drawings, the numeral 10 designates a tubing or other support upon which the by-pass and clutch are mounted, the lower end of the tubing carrying external screw-threads 11. The by-pass is formed of an elongate outer housing which includes an elongate cylindrical upper portion 12 having an internally screw-threaded box 13 provided at its upper end. The box 13 engages the screw-threads 11 upon the lower end of the tubing 10 and secures the by-pass to said tubing. An axial bore 14 is provided within the upper portion 12 and extends throughout the length thereof. An internal annular groove 15 is formed in the wall of the bore 14 at a point intermediate the ends thereof, and communicates with a plurality of radial ports 16 extending outwardly through the walls of the upper portion 12 to the well bore.

The upper portion of the bore 14 is enlarged above the groove to form an annular shoulder or seat 17 and has internal screw-threads 18 at its upper portion. Suitable packing rings 19, such as chevron packing rings, engage the wall of the enlarged portion of the bore and rest upon the shoulder 17. A packing gland 20 has engagement with the screw-threads 18 and is utilized for distorting the packing into sealing position and also for holding said packing in such position. Similarly, the lower portion of the bore 14 is enlarged to form a shoulder 21, and the extreme lower portion of the bore 14 carries internal screw-threads 22. Chevron or other suitable packing rings 23 engage the shoulder 21, while a packing collar 24 is provided in the enlarged portion below the rings 23. Inverted chevron or other suitable packing rings 25 are positioned below the collar 24. The packing rings 23 and 25 are distorted into sealing position by a packing gland 26 which engages the screw-threads 22.

An elongate tubular mandrel or member 27 having an axial bore 27' extends through the bore 14 and has a sliding fit therein. The member 27 extends upwardly to a point spaced a short distance below the box 13 when in the position shown in Figure 6, and carries a plurality of radial ports 28 at a point intermediate its ends. The outer surface of the tubular member 27 is snugly engaged by the packing rings 19 and the packing rings 23 and 25, whereby a positive seal between the mandrel and body is affected without interfering with free longitudinal movement of the mandrel within the bore 14. When the mandrel 27 is in its uppermost position, as is shown in Figure 1, the ports 28 are in horizontal alinement with the ports 16 and communication is set up between the bore 27' of the mandrel 27 and the well bore. Downward movement of the member to its lowermost position will bring the ports 28 into horizontal alinement with the packing collar 24, in which position communication through the ports 28 is positively shut off. It is pointed out, that any pressure exerted through the ports 28 will serve only to further expand the packing rings 23 and the packing rings 25 because of their chevron structure and thus more positively seal said ports.

The lower extremity of the upper portion 12 is formed with a screw-threaded pin 29 adapted to engage a screw-threaded box 30 provided upon the upper extremity of a lower portion 31. The lower portion 31 is formed with substantially the same outside diameter as the upper portion 12, and has an axial bore 32 extending throughout its length in vertical alinement with the bore 14. A plurality of female splines 33 are provided in the inside wall of the bore 32 and extend from a point spaced below the box 30 to the lower extremity of said bore. An externally screw-threaded pin 34 is carried upon the lower extremity of the lower portion 31, and a collar 35 is secured thereto by means of an internally screw-threaded box 36 formed on its upper end. An axial bore 37 extends throughout the length of the collar 35 and is in vertical alinement with, and has substantially the same diameter as, the bores 32 and 14.

The tubular mandrel 27 extends downwardly through the bore 32 of the lower portion 31 and the bore 37 of the collar 35, said mandrel carrying a plurality of male splines 38 which engage within the female splines 33. As will readily be seen in Figures 1 and 6, the splines 38 limit the longitudinal movement of the mandrel 27 to the length of the female splines 33 since the upward movement of the member is limited by the engagement of the male splines 38 with the upper extremity of the female splines 33, and the downward movement of the mandrel is limited by the engagement of the male splines 38 with the upper surface of the collar 35. In this lowermost position, as shown in Figure 6, any weight suspended from the member 27 is transmitted through the male splines 38 to the collar 35, through the lower portion 31 and the upper portion 12, to the tubing 10. In a similar fashion, the weight of the tubing 10 may be placed upon the upper portion 12 and the lower portion 31, and be transmitted from the latter to the splines 38 and the member 27, as is shown in Figure 1. In the latter position, the ports 28 are open so as to communicate from the bore 27' of the tubular member 27 to the well bore. As will readily be seen, any rotary motion applied to the tubing 10 will be transmitted through the upper portion 12 and the lower portion 31 to the female splines 33. The constant engagement of the splines 38 with the splines 33 will transmit this rotary motion to the member 27 regardless of the longitudinal position of the mandrel with respect to the outer housing.

The tubular mandrel 27 extends some distance downwardly from the collar 35, and carries external screw-threads 39 upon its lower extremity. A collar 40 having an axial bore 41 is secured to the mandrel 27 by means of internal screw-threads 42 which are formed in the upper portion of the bore 41 and engage the screw-threads 39. The lower portion of the bore 41 is also screw-threaded, and has screw-threaded engagement with the upper extremity of an elongate tubular member 43 having an axial bore 44, said member forming a continuation of the mandrel. The lower surface of the collar 40 is provided with a pair of downwardly-extending, diametrically-opposed clutch jaws 45, which are designed to engage complementary clutch jaws to be described hereinafter. A sleeve 46 encompasses the member 43 below the collar 40, the member passing through an axial bore 47 provided throughout the length of said sleeve. A pin 48 having left-hand screw-threads 49 is formed upon the lower extremity of the sleeve 46, and engages within a box 50 carrying left-hand, internal screw-threads 51, and disposed upon the upper extremity of a sleeve 52, whereby said sleeve 52 is fastened to the sleeve 46. The engagement of the left-hand screw-threads 49 by the left-hand screw-threads 51 forms a connecting joint which may be broken by right-hand rotation. The lower extremity of the sleeve 52 carries external screw-threads 53 which engage and support a cement retainer 54.

The upper surface of the sleeve 46 is provided with a pair of upwardly-extending, diametrically-opposed clutch jaws 55 which are designed to engage the clutch jaws 45 and thereby make possible the transmission of rotary motion from the collar 40 to said sleeve. A packing gland 56, having chevron or other suitable packing rings 57 and a packing gland nut 58, is provided in the upper portion of the sleeve 46 so as to seal between the mandrel 43 and the bore 47 and prevent leakage therethrough. The mandrel extends downwardly through the sleeve 46 to a point near the lower portion of the sleeve 52, and has a plurality of radially extending male splines 59 formed on its lower portion. The sleeve 52 is formed with an axial bore 60 which extends from the upper extremity of said sleeve to a point spaced from the lower end thereof, said bore being of sufficient diameter as to allow the splines 59 to have a sliding fit therein. A plurality of radial female splines 61 are disposed about the wall of the upper portion of the bore 60, whereby when the mandrel 43 is in its uppermost position, as is shown in Figure 7, the splines 59 engage the splines 61 and rotary motion may be transmitted from the collar 40, through the mandrel 43, to the sleeve 52 and the retainer 54. In this position the retainer may be rotated to set the same. In the lowermost position of the mandrel, as shown in Figure 2, right-hand rotation of the collar 40 will rotate the sleeve 46 by means of the clutch jaws 45 and 55 and unscrew the left-hand joint formed by the left-hand screw-threads 49 and 51, thus allowing the tubing, the by-pass, and a portion of the clutch mechanism to be withdrawn from the well bore. It is pointed out that the upper surfaces of the male splines 59 and the lower surfaces of the female splines 61 are cut at an angle so as to assure the operator of the splines readily meshing when so desired. A short axial bore 62 communicates with the bore 63 provided in the cement retainer 54.

When it is desired to run cement into a well bore, the assembly including the by-pass and the clutch, with the cement retainer 54 suspended therefrom, is lowered to a suitable point within the well bore. It is pointed out that the weight of the tools will force the sleeve 52 and the sleeve 46 downwardly so that the splines 59 and 61 engage, while the clutch jaws 45 and 55 are disengaged, as is shown in Figure 7. Also, the tension between the tubular member 27 and the tubing 10 will force the male splines 38 to assume the position shown in Figure 6, so that the ports 28 are sealed by the packing rings 23 and 25. In this position, right-hand rotation of the tubing 10 will rotate the upper portion 12 of the by-pass and the lower portion 31, which in turn, through the splines 33 and 38, will rotate the tubular member 27. The rotation of the member 27 will rotate the collar 40 and the mandrel 43 which, through the engagement of the splines 59 with the splines 61, will cause the sleeve 52 and the cement retainer 54 to rotate, thus setting the retainer. After the retainer is set, both by rotation and by placing tension on the tubing string 10, the cement may be pumped downwardly through said tubing, through the bore 27', the bore 44, the bore 60 and the bore 62, into the bore 63 of the retainer from where it is delivered to the well bore. It is to be noted that the entire path of the cement is protected against leakage by suitable packing glands.

After the cement has been pumped into position, it becomes desirable to detach the tubing string and as many tools as possible from the retainer. Downward movement of the tubing 10 will cause the by-pass to move into the position shown in Figure 1, whereby the cement within the bore of the tubing is free to flow out through the ports 28, into the recess 15, and from the recess through the ports 16, into the well bore. Further downward movement of the tubing 10 will cause the clutch to move into the position shown in Figure 2, wherein the splines 59 and 61 are disengaged and the clutch jaws 45 and 55 engaged. With the apparatus in this position, right-hand rotation of the tubing 10 will cause the portions 12 and 31, the member 27, and the collar 40 to rotate as hereinbefore described. The collar 40, through the clutch jaws 45 and 55, will rotate the sleeve 46 in a right-hand direction and unscrew the left-hand joint formed by the screw-threads 49 and 51. It is noted that the mandrel 43 will also rotate, but this will be of no consequence since the splines 59 and 61 are disengaged. As the left-hand joint is broken, the entire assembly, with the exception of the sleeve 52 and the cement retainer 54, may be withdrawn from the well bore. This is true because the male splines 59 on the mandrel 43 will support the sleeve 46 so that it may be removed from the well opening.

Thus, it will be seen, a simple yet positive apparatus is had, whereby a well bore may be cemented and the tools removed from the bore.

Various changes, alterations and modifications may be made in the size, shape and arrangement of the herein described elements, within the scope of the appended claims.

What I claim and desire to secure by Letters Patent is:

1. A device, of the character described, for detachably connecting a conductor with a well tool including, a body having one end secured to the conductor, an elongate member mounted in the body and being incapable of rotative movement relative to the body, said member being adapted to undergo a limited longitudinal movement with relation to the body, and clutching means disposed between the member and the well tool and arranged to be actuated by the longitudinal movement of the member, whereby when the clutching means is engaged a rotation may be imparted to the tool from the conductor and through the body and member, the body and member having ports therein which are adapted to register with each other when the member is in a predetermined longitudinal position with relation to the body, whereby the fluid within the conductor may be drained therefrom through the registering ports.

2. A device, of the character described, for detachably connecting a conductor with a well tool including, a body having one end secured to the conductor, an elongate member mounted in the body and being incapable of rotative movement relative to the body, said member being adapted to undergo a limited longitudinal movement with relation to the body, means for connecting the lower end of the member with the well tool, said means being arranged to permit the member to undergo a limited longitudinal movement relative to the tool, and a clutching means disposed between the member and tool and actuated by the longitudinal movement of the member, whereby when the clutching means is engaged a rotation may be imparted to the tool from the conductor and through the body and member, the body and member having ports therein which are adapted to register with each other when the member is in a predetermined longitudinal position with relation to the body, whereby the fluid within the conductor may be drained therefrom through the registering ports.

3. A device, of the character described, for detachably connecting a conductor with a well tool including, a body having one end secured to the conductor, an elongate member mounted in the body and being incapable of rotative movement relative to the body, said member being adapted to undergo a limited longitudinal movement with relation to the body, the body and member having ports therein which are adapted to register with each other when the member is in a predetermined longitudinal position with relation to the body, whereby the fluid within the conductor may be drained therefrom through the registering ports, and clutching means disposed between the member and the well tool and arranged to be actuated by the longitudinal movement of the member whereby the clutching means may be engaged in one position to permit rotative movement to be imparted to the tool from the conductor and through the body and member, and disengaged in another position to permit the device and conductor to be detached from the tool through the rotation of the body and member by the conductor.

4. A device, of the character described, for detachably connecting a conductor with a well tool including, a body having one end secured to the conductor, an elongate member mounted in the body and being incapable of rotative movement relative to the body, said member being adapted to undergo a limited longitudinal movement with relation to the body, the body and member having ports therein which are adapted to register with each other when the member is in a predetermined longitudinal position with relation to the body, whereby the fluid within the conductor may be drained therefrom through the registering ports, and clutching means disposed between the member and the well tool and arranged to be actuated by the longitudinal movement of the member whereby when the clutching means is disengaged the device and conductor may be detached from the tool through the rotation of the body and member by the conductor.

5. A device, of the character described, for detachably connecting a conductor with a well tool including, an upper body adapted to be secured to the conductor, a lower body adapted to be secured to the well tool, an elongate member mounted in the upper body so as to be incapable of rotative movement relative thereto, said member extending into the lower body and having a splined connection therewith, said splined connection being adapted to be disengaged upon longitudinal movement of the member within the lower body, a clutch member carried by said lower body and providing a stop for retaining said elongate member in connection with the lower body, and a coacting clutch member secured to the elongate member and adapted to engage the first clutch member when the splined connection is disengaged so as to effect the rotation of said first clutch member relative to the lower body and the release of the upper body, elongate member and clutch members from said lower body and well tool.

ROSS BASSINGER.